United States Patent
Poloni et al.

(10) Patent No.: US 12,522,105 B2
(45) Date of Patent: Jan. 13, 2026

(54) BATTERY THERMAL CONTROLS FOR BATTERIES USED IN ELECTRIC VEHICLES AND POWER WALL APPLICATIONS

(71) Applicant: Garrett Transportation I Inc., Torrance, CA (US)

(72) Inventors: Tomas Poloni, Malinovo (SK); Paul Dickinson, Bristol (GB)

(73) Assignee: Garrett Transportation I Inc., Torrance, CA (US)

( * ) Notice: Subject to any disclaimer, the term of this patent is extended or adjusted under 35 U.S.C. 154(b) by 297 days.

(21) Appl. No.: 18/305,146

(22) Filed: Apr. 21, 2023

(65) Prior Publication Data

US 2024/0351475 A1     Oct. 24, 2024

(51) Int. Cl.
  *B60L 58/25* (2019.01)
  *B60L 58/12* (2019.01)
  *B60L 58/16* (2019.01)
  *H01M 10/625* (2014.01)
  *H01M 10/633* (2014.01)

(52) U.S. Cl.
  CPC ............ *B60L 58/25* (2019.02); *B60L 58/12* (2019.02); *B60L 58/16* (2019.02); *H01M 10/625* (2015.04); *H01M 10/633* (2015.04); *B60L 2240/545* (2013.01); *B60L 2240/549* (2013.01); *B60L 2260/20* (2013.01); *H01M 2220/20* (2013.01)

(58) Field of Classification Search
  None
  See application file for complete search history.

(56) References Cited

U.S. PATENT DOCUMENTS

| | | |
|---|---|---|
| 8,417,403 B2 | 4/2013 | Iida et al. |
| 9,358,898 B2 | 6/2016 | Endo et al. |
| 9,586,579 B1 | 3/2017 | Laskowsky et al. |
| 10,099,569 B2 | 10/2018 | Lindemann et al. |

(Continued)

FOREIGN PATENT DOCUMENTS

| | | | |
|---|---|---|---|
| CN | 113173106 A | * 7/2021 | ............... B60L 58/12 |
| CN | 113224411 A | * 8/2021 | |

OTHER PUBLICATIONS

International Search Report and Written Opinion dated May 21, 2024 for International Application No. PCT/US2024/014149.

*Primary Examiner* — Jelani A Smith
*Assistant Examiner* — Davin Seol
(74) *Attorney, Agent, or Firm* — BelayIP

(57) ABSTRACT

A method includes implementing an inverted degradation model to determine an optimal battery core temperature. The inverted degradation model receives as inputs one or more of a power state value indicating whether the battery is currently in a high-power state or a low power state, a battery temperature value representing a current battery core temperature, a battery degradation value representing a battery degradation status, a battery age indicator representing a current age of the battery, a state of charge value representing a remaining battery charge and a battery current load value representing a current draw from the battery by the electric vehicle. The inverted degradation model outputs a desired battery core temperature value. The method includes operating the battery thermal system in order to achieve the desired battery core temperature.

20 Claims, 13 Drawing Sheets

(56) References Cited

U.S. PATENT DOCUMENTS

| | | |
|---|---|---|
| 10,160,340 B2 | 12/2018 | Lindemann et al. |
| 10,471,847 B1 | 11/2019 | Han et al. |
| 10,481,623 B1 | 11/2019 | Forouzan et al. |
| 10,730,401 B2 | 8/2020 | Jin et al. |
| 10,759,303 B2 | 9/2020 | Duan et al. |
| 11,075,414 B2 | 7/2021 | Yokotsuji et al. |
| 11,084,398 B2 | 8/2021 | Marcicki et al. |
| 11,417,916 B2 | 8/2022 | Duan et al. |
| 11,465,529 B1 | 10/2022 | Palombini |
| 2013/0317690 A1 | 11/2013 | Fujita et al. |
| 2015/0147608 A1 | 5/2015 | Lin et al. |
| 2018/0304765 A1 | 10/2018 | Newman et al. |
| 2020/0262313 A1* | 8/2020 | Muniz .................... B60L 58/16 |
| 2021/0111446 A1* | 4/2021 | Stewart ............. H01M 10/0525 |
| 2021/0354591 A1 | 11/2021 | Iida et al. |
| 2022/0344734 A1* | 10/2022 | Tanovic ............. H01M 10/486 |
| 2023/0226948 A1* | 7/2023 | Ozcelik ............. H01M 10/6568 |
| | | 700/300 |
| 2024/0429730 A1* | 12/2024 | Abbott ................. H01M 10/46 |

\* cited by examiner

BATTERY THERMAL CONTROLS FOR BATTERIES USED IN ELECTRIC VEHICLES AND POWER WALL APPLICATIONS

BACKGROUND

There are several competing performance characteristics that are useful in to consider when maintaining and operating a battery within an electric vehicle such as a hybrid vehicle or a battery electric vehicle or within a power storage application such as a power wall. For example, cooler battery temperatures result in reduced battery degradation, and thus can result in an improved battery lifetime. Cooler battery temperatures also reduce the effective driving range and reduce a total amount of power that can be drawn from a battery in a power storage application. Warmer battery temperatures, while resulting in increased battery degradation, result in increased driving range and increased power draw. A warm battery provides better performance while a cooler battery has a longer life. These performance characteristics need to be balanced against each other when instituting battery thermal controls for a battery in a battery electric vehicle. A complicating factor is that while in general a battery loses performance as the battery ages, the battery is most sensitive to temperature-related degradation when the battery is new or nearly new. New and alternative methods, controllers and systems for battery thermal control for batteries in electric vehicles, including both battery electric vehicles as well as hybrid vehicles, and power storage applications are desired.

OVERVIEW

The present inventors have recognized, among other things, that a problem to be solved is the need for new and/or alternative methods, controllers and systems for battery thermal control in electric vehicles and power storage applications. Battery thermal control relates both to times in which the vehicle is being driven and power for operating the vehicle is provided by the battery, as well as when the vehicle is parked. Battery thermal control also relates to batteries used in power storage applications. An example may be found in a method of balancing performance and battery degradation for a battery installed within an electric vehicle, the electric vehicle including a battery thermal system. The method includes implementing an inverted degradation model to determine an optimal battery core temperature. The inverted degradation model receives as inputs one or more of a power state value indicating whether the battery is currently in a high-power state or a low power state, a battery temperature value representing a current battery core temperature, a battery degradation value representing a battery degradation status, a battery age indicator representing a current age of the battery, a state of charge value representing a remaining battery charge and a battery current load value representing a current draw from the battery by the electric vehicle. The inverted degradation model outputs a desired battery core temperature value. The method includes operating the battery thermal system in order to achieve the desired battery core temperature.

Alternatively or additionally, the inverted degradation model may be configured to weigh battery performance against battery degradation. Alternatively or additionally, the inverted degradation model may be configured to more heavily weigh battery degradation, at the expense of battery performance, when the battery age indicator is below a battery age threshold. Alternatively or additionally, the high-power state may correspond to operation of the electric vehicle. Alternatively or additionally, the power state value may further indicate whether the electric vehicle is being operated in an economy mode, a normal mode or a sport mode. Alternatively or additionally, the high-power state may correspond to active charging of the battery.

Alternatively or additionally, operating the battery thermal system in order to achieve the desired core battery temperature may include using a nonlinear model predictive control module to command operation of the battery thermal system. The nonlinear model predictive control module may utilize the battery core temperature value, the desired battery core temperature, and an ambient temperature value representing an ambient temperature exterior to the electric vehicle. The nonlinear model predictive control module may output command signals to the battery thermal system in accordance with the received values.

Another example may be found in a system for optimizing battery health in an electric vehicle. The system includes an input for receiving sensor signals, an output for sending command signals, and a controller. The controller includes an inverted degradation model block that is configured to receive sensor signals from the input and to provide a desired battery core temperature value, and a non-linear model predictive control block that is configured to receive the desired battery core temperature value from the inverted degradation model block and to provide one or more command signals to the output, the one or more command signals commanding operation of a battery thermal system.

Alternatively or additionally, the inverted degradation model block may receive sensor signals including one or more of a battery temperature value representing a current battery core temperature, a battery degradation value representing a battery degradation status, a battery age indicator representing a current age of the battery, and a battery current load value representing a current draw from the battery by the electric vehicle.

Alternatively or additionally, the inverted degradation model block may further receive one or more of a power state value indicating whether the battery is currently in a high-power state or a low power state, and a state of charge value representing a remaining battery charge. Alternatively or additionally, the high-power state may correspond to operation of the electric vehicle. Alternatively or additionally, the power state value may further indicate whether the electric vehicle is being operated in an economy mode, a normal mode or a sport mode. Alternatively or additionally, the inverted degradation model block may further receive an indication of battery age. Alternatively or additionally, the non-linear model predictive block may receive sensor signals including one or more of the battery temperature value and an ambient temperature value representing an ambient temperature exterior to the electric vehicle.

Another example may be found in a method of ascertaining an optimal battery thermal condition for a battery. The method includes receiving a power state value indicating as to whether the battery is currently in a high-power state or a lower power state, receiving a battery temperature value representing a current battery temperature, and receiving a battery degradation value representing a battery degradation status. The power state value, the battery temperature value and the battery degradation value are provided to an inverted degradation model and the inverted degradation model outputs a desired battery core temperature. The method includes commanding a battery heating and cooling system to achieve the desired battery core temperature.

Alternatively or additionally, the battery may be installed within a power wall. Alternatively or additionally, the battery may be installed within an electric vehicle. Alternatively or additionally, the high-power state may correspond to operation of the electric vehicle. Alternatively or additionally, the power state value may further indicate whether the electric vehicle is being operated in an economy mode, a normal mode or a sport mode. Alternatively or additionally, the high-power state may correspond to active charging of the battery.

This overview is intended to provide an introduction to the subject matter of the present patent application. It is not intended to provide an exclusive or exhaustive explanation. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
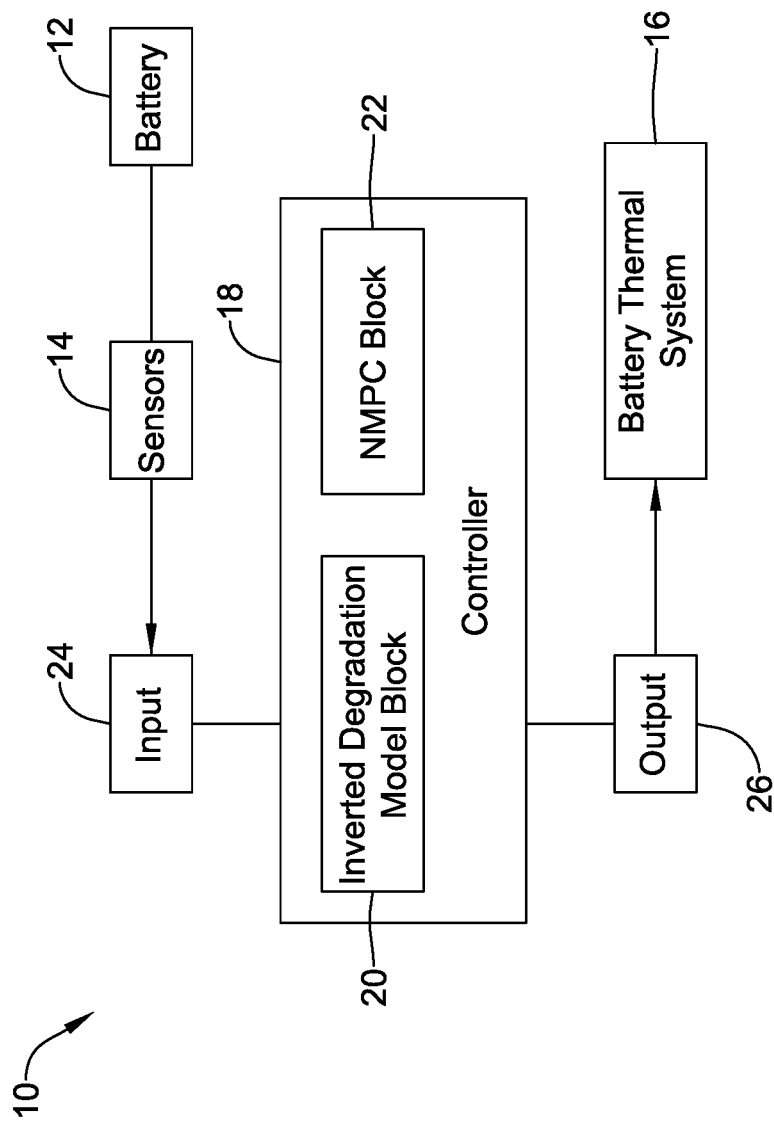
FIG. 1 is a schematic block diagram showing an illustrative system.

Rechargeable batteries are used in a variety of different applications. For example, rechargeable batteries may be used in power walls, which are used to store power generated by a home's solar panels. Power is generated while the sun is shining and can be stored within the power wall for use when the sun is not shining. In some instances, power walls may be dedicated to storing electrical power for use when the electrical grid is not producing electricity or is not producing sufficient electrical power. In some instances, a power wall combined with solar panels may function similarly to a fossil fuel-powered generator, i.e., providing emergency electrical power, but without the need to burn a fossil fuel such as natural gas or even gasoline to power the fossil-fueled generator.

Increasingly, rechargeable batteries are being used in electric vehicles. An electric vehicle includes one or more electric motors that are powered by electricity that is stored within the rechargeable batteries. Some electric vehicles have an electric motor coupled to a transmission box and drive shaft, such that all wheels are driven by a central electric motor. Some electric vehicles have an electric motor operably coupled to each axle, or to a single axle. Some electric vehicles have an electric motor operably coupled to each wheel. An all-electric vehicle is powered only by its batteries, and does not have any onboard power generation capability. An all-electric vehicle is periodically plugged in to an electrical outlet or some form of charging station. Many retail establishments are now providing charging stations within their parking lots, and home charging stations are now available for homeowners to purchase and install.

Rechargeable batteries are also being used in hybrid electric vehicles. A hybrid electric vehicle includes one or more electric motors that are powered by electricity that is stored within rechargeable batteries, and also has a separate engine such as an internal combustion engine. The internal combustion engine may be used to generate electricity to help recharge the rechargeable batteries and thus increase the available range of the vehicle. In some instances, the internal combustion engine may be operably coupled via a transmission to one or more axles in order to help propel the vehicle. Energy recuperation systems may be included, such as regenerative braking systems, to charge the battery using kinetic energy of the vehicle. Some vehicles, such as sports cars, are being developed that have an internal combustion engine driving one axle, such as the rear axle, and one or more electric motors driving another axle, such as the front axle. This effectively provides a sports car with all-wheel drive, not to mention additional power.

Rechargeable batteries such as those discussed herein can be large, complex and expensive. Such batteries typically include a thermal management system that senses battery temperature and heats or cools the battery in accordance with a control algorithm. There is a desire to attempt to maximize the effective lifespan of these batteries. In some instances, the effective lifespan of a rechargeable battery is a function of temperature. In some instances, the available range, or how far the battery can power the electric vehicle, is a function of temperature. In some instances, the available power, or how much power can be instantaneously provided from the battery, is a function of temperature. As battery core temperature increases, the available range and the available power generally increase. Unfortunately, increased battery temperatures tend to increase battery degradation, so it will be appreciated that there is a balancing act between battery life, battery range and battery power. In some instances, a rechargeable battery is particularly sensitive to thermally-induced degradation early in the life of the rechargeable battery. Thus, how the battery is utilized, particularly when new or nearly new, can have a significant impact on the overall lifespan of the battery.

Recharging batteries from an external source is a frequent source of customer concerns. Fast charging times are desired, but temperature affects the ability to charge a battery quickly and without excessive degradation of battery life and/or capacity. A cold battery can only accept limited charge per unit time without degradation or outright damage; a too-hot battery can degrade when charging. Again there are many trade-offs.

FIG. 1 is a schematic block diagram of an illustrative system 10 for optimizing battery health. The illustrative system 10 may be employed as part of a power wall, for example. In some instances, the system 10 may be employed as part of an electric vehicle, including a hybrid vehicle, a plug-in hybrid vehicle or even a full electric vehicle. The system 10 includes a battery 12. The battery 12 may represent a single battery, or the battery 12 may generically represent a plurality of batteries that are wired together to function as a single battery. The system 10 includes a number of sensors 14. While a single block is shown, it will be appreciated that this is merely illustrative, and the system 10 may include any number of sensors 14. At least some of the sensors 14 may be operably coupled with the battery 12.

The sensors 14 may include one or more temperature sensors that output a signal representative of a current battery core temperature. The sensors 14 may include one or more temperature sensors that output a signal representative of an ambient temperature. The sensors 14 may include a sensor that outputs a signal representative of a state of charge of the battery 12. The sensors 14 may include a sensor that outputs a signal representative of an instantaneous current draw from the battery 12. The sensors 14 may include a sensor that outputs a signal representative of a power state of the battery 12, such as whether the battery 12 is currently in a high-power state or a low power state. A high-power state may include the battery 12 currently outputting power, or may include when the battery 12 is being recharged. These are just examples, and the system 10 may include a variety of other sensors 14 as well.

The system 10 includes a battery thermal system 16. In some instances, the battery thermal system 16 may be configured to control and/or adjust the battery core temperature. In some instances, when there is a desire to decrease the battery core temperature, the battery thermal system 16 may be configured to cool the battery 12. The battery thermal system 16 may include a refrigeration unit in which a refrigerant is cycled between being compressed to release heat and being expanded to absorb heat, a heat exchanger, and/or a circulating coolant. In some instances, when there is a desire to increase the battery core temperature, such as when ambient temperatures are low, the battery thermal system 16 may be configured to heat the battery 12. The battery thermal system 16 may include one or more resistive heaters that utilize power from the battery 12 to heat the battery 12.

The system 10 includes a controller 18. In some instances, the controller 18 includes or is configured to execute an inverted degradation model block 20 and an NMPC (Non-Linear Model Predictive Control) block 22. In some instances, the controller 18 is operably coupled with an input 24 and an output 26. The input 24 may be configured to receive signals from the sensors 14. The output 26 may be configured to send command signals to the battery thermal system 16, where the command signals are generated by the controller 18. In some instances, the inverted degradation model block 20 may be configured to receive sensor signals from the input 24 and to determine a desired battery core temperature value. In some instances, the NMPC block 22 may be configured to receive the desired battery core temperature value from the inverted degradation model block 20 and to provide one or more command signals to the output 26, the one or more command signals commanding operation of the battery thermal system 16 as necessary to either heat or cool the battery 12.

In some instances, the inverted degradation model block 20 may receive sensor signals from the sensors 14 that include one or more of a battery temperature value representing a current battery core temperature, a battery degradation value representing a battery degradation status, a battery age indicator representing a current age of the battery, and a battery current load value representing a current draw from the battery by the electric vehicle. In some instances, the inverted degradation model block 20 may further receive one or more of a power state value indicating whether the battery is currently in a high-power state or a low power state and a state of charge value representing a remaining battery charge. In some instances, the inverted degradation model block 20 may further receive or track an indication of battery age. As an example, the controller 18 may include a timer that is reset when the battery 12 is replaced. In some instances, the high-power state may correspond to power being actively drawn from the battery 12. In instances in which the system 10 is deployed within an electric vehicle, the high-power state may also provide an indication as to whether the electric vehicle is being operated in an economy mode, a normal mode or a sport mode.

In some instances, the NMPC block 22 may receive sensor signals including one or more of the battery temperature value and an ambient temperature value representing an ambient temperature exterior to the electric vehicle. In some instances, the NMPC block 22 may utilize the desired battery core temperature and an indication of ambient temperatures to determine if and when, and how, to operate the battery thermal system 16 in order to achieve the desired battery core temperature. For example, if the desired battery core temperature is lower than the current battery core temperature, meaning there is a desire to cool the battery 12, but ambient temperatures are cool and are dropping, the NMPC block 22 may determine that the battery 12 will achieve its desired battery core temperature without having to expend battery energy to actively cool the battery 12. Similarly, if the desired battery core temperature is higher than the current battery core temperature, meaning there is a desire to heat the battery 12, but ambient temperatures are warm and increasing, the NMPC block 22 may determine that the battery 12 will achieve its desired battery core temperature without having to expend battery energy to actively heat the battery 12. As another example, the battery core temperature may be expected to continue to increase as a result of a load being applied to the battery 12 such as driving an electric vehicle including the battery 12, or pulling power from a power wall. The NMPC block 22 may determine whether the battery 12 will increase to a temperature requiring cooling. These are just examples.

Figure 2:
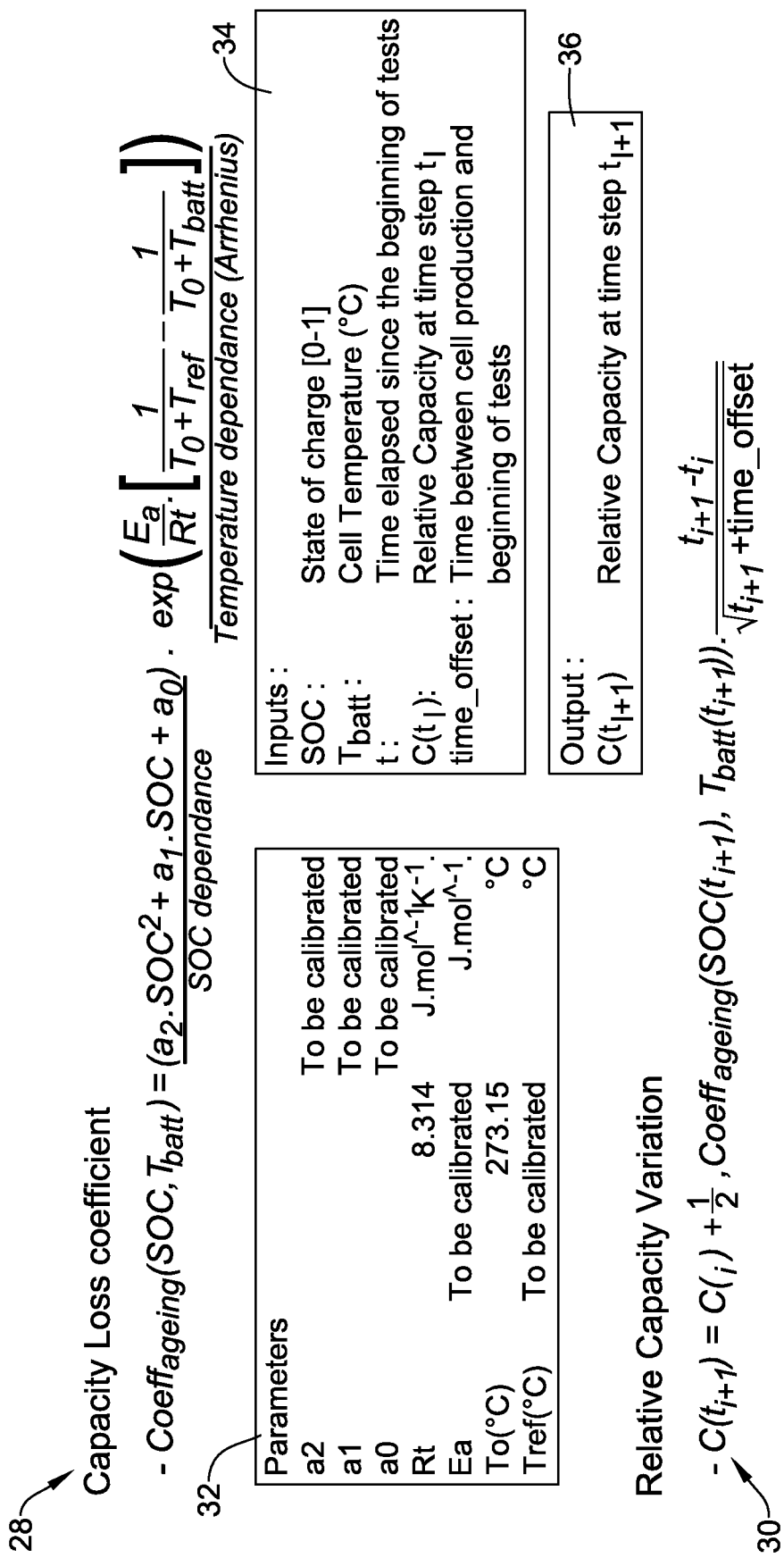
FIG. 2 shows several equations used by the illustrative system of FIG. 1.
Figure 3:
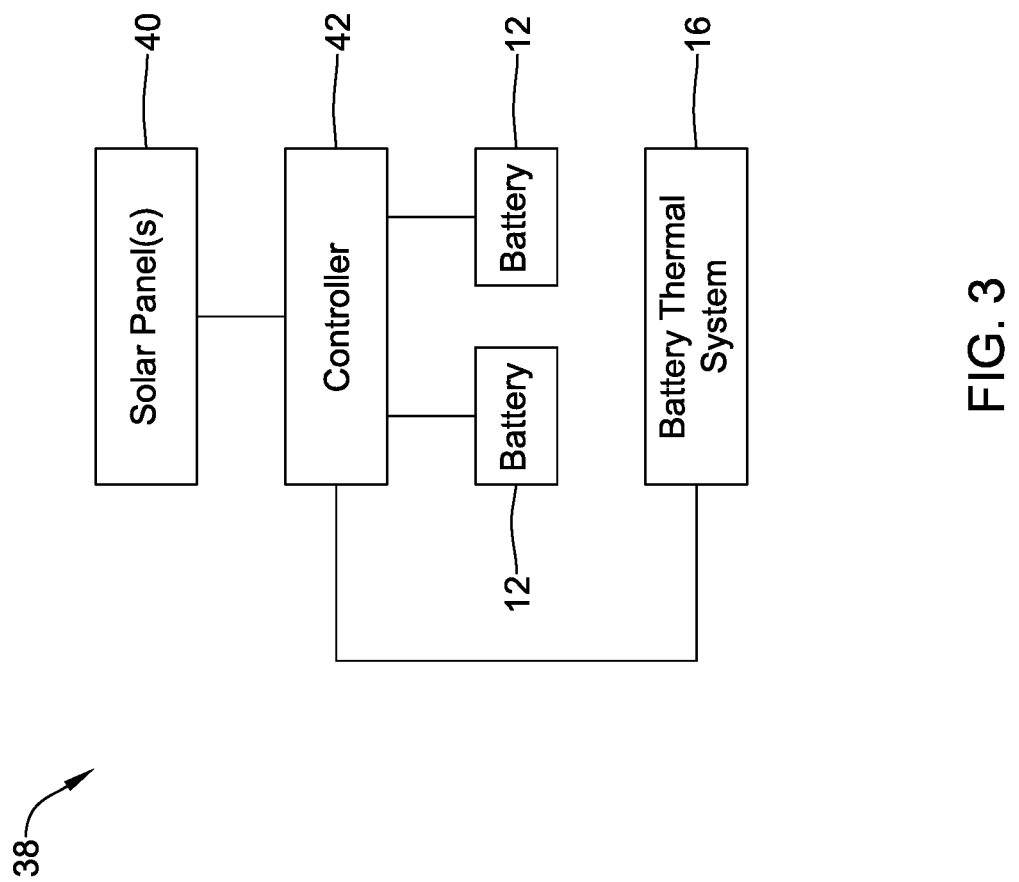
FIG. 3 is a schematic block diagram showing an illustrative power wall.

In some instances, the inverted degradation model block 20 may utilize one or more equations in ascertaining how the battery 12 is undergoing degradation. FIG. 2 shows an equation 28 for determining a capacity loss coefficient as well as an equation 30 for determining a relative capacity variation. A number of parameters are outlined at 32. A block 34 defines each of the inputs to the equation 28. A block 36 defines the output of the equation 30. In some instances, a feedback principle may be used in order to find a model inversion via the controller 18. As an example, the controller 18 may be a PI (Proportional Integral) controller, but other controllers such as a P (Proportional) controller and/or a PID (Proportional Integral Derivative) controller are contemplated. The controller 18 controls the battery control temperature $T_{batt}$. The degradation model represented by the equations in FIG. 2 plays an integral role. The system 10 may be implemented within a power wall. FIG. 3 is a schematic block diagram of an illustrative power wall 38. The illustrative power wall 38 includes the features and functionality of the system 10. In some instances, the power wall 38 may be considered as being a modern, non-polluting version of an emergency generator. The power wall 38 generates and stores electrical power when the sun is shining and can utilize the stored electrical power at times that the sun is not shining, such as at night or during inclement weather. The power wall 38 may be used to provide electrical power when the main power grid is off-line, and electrical power from the power wall 38 may be used to power one or more circuits within a home, such as powering a refrigerator and some lights. In some instances, depending on the capacity of the power wall 38, the power wall 38 may be used to power most if not all of the electrical needs of a home.

When the sun is shining, one or more solar panels 40 generate electrical power that is stored within the batteries 12. While a total of two batteries 12 are shown, it will be appreciated that in some instances the power wall 38 may include a single battery 12, or may include three, four or more batteries 12, depending on the power requirements for the power wall 38. A controller 42 may be considered as including the functionality of the controller 18 (FIG. 1), in that the controller 42 receives sensor signals and determines a desired battery core temperature, and also commands the battery thermal system 16 to take appropriate action to either warm or cool the batteries 12 in order to achieve the desired battery core temperature. The controller 42 also controls the flow of electrical power from the solar panel(s) 40 to the batteries 12.

Input power may come from other sources than solar panels 40. For example, a wind-driven or water-driven turbine may provide power input. Geothermal or other systems may be used instead. Rather than a solar panel converting sunlight into electricity, a solar thermal collector system may provide power by converting thermal energy.

Figure 4:
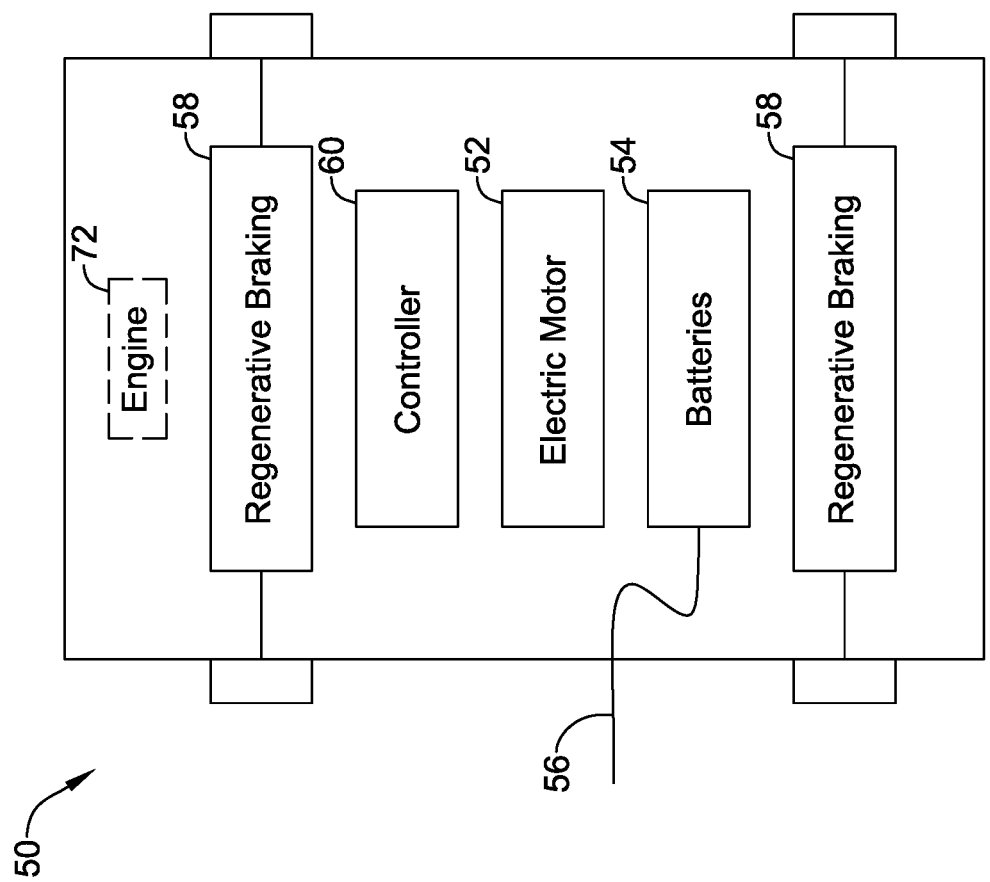
FIG. 4 is a schematic block diagram showing an illustrative vehicle.

The system 10 may be implemented within an electric vehicle. FIG. 4 is a schematic block diagram of an illustrative electric vehicle 50 shown in simplified block form. The skilled person will recognize that the following discussion may not necessarily describe every feature that would be present in the vehicle 50, to avoid excessive exposition of features that are not necessary to understanding the following examples.

The vehicle 50 includes electric motor 52 (or plural electric motors 52) that provide motive force to the vehicle 50, powered by batteries 54. The batteries 54 are rechargeable by connection 56 to an off-vehicle electricity source, as is known in the art, and may have any suitable chemistry and/or design. The batteries 54 may be associated with various secondary features, such as warming and/or cooling apparatuses to maintain suitable temperatures therein. The battery thermal system 16 (FIG. 1) is an example of these secondary features. Regenerative braking 58 may be provided, and serves to at least partly recharge the batteries 54 under suitable braking conditions.

Figure 5:
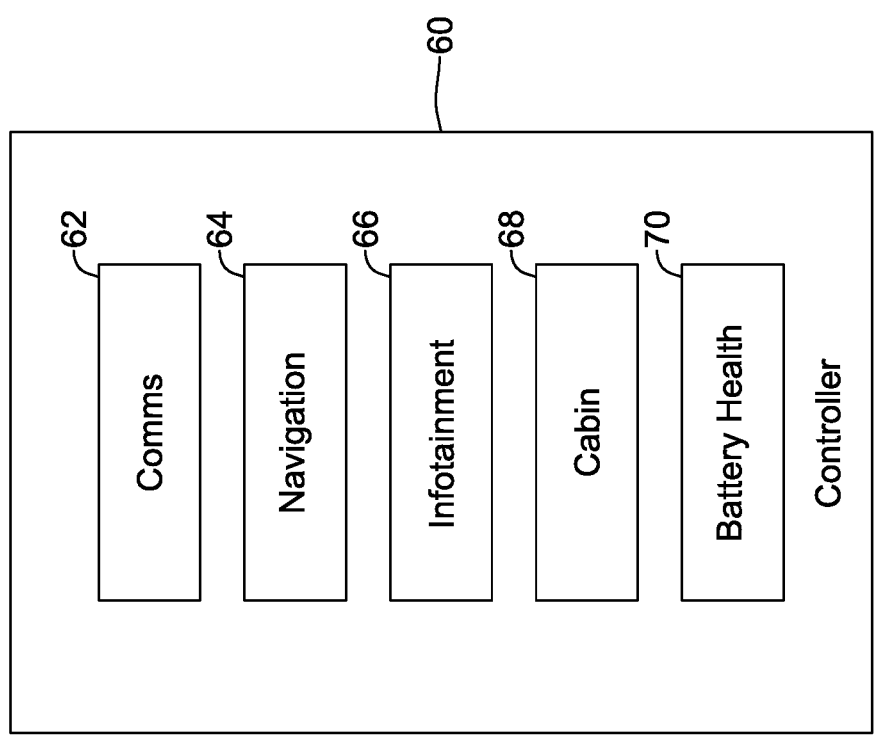
FIG. 5 is a schematic block diagram of an illustrative controller forming part of the illustrative vehicle of FIG. 4.

A controller 60 is coupled to each of these blocks, and as seen in FIG. 5, may further be linked to control blocks for communications 62, navigation 64, infotainment 66, and cabin 68. The controller 60 is configured for sending and receiving information as well as to provide and/or control power used by, for example, an air conditioning unit used for cooling the cabin 68, or other environmental controls for the cabin 68. The communications 62 may include any of satellite, cellular, Bluetooth, broadband, WiFi, and/or various other wireless communications circuits, antennae, receivers, transceivers, transmitters, etc., as desired. The communications 62 may allow the controller 60 to send and receive data relative to one or more internet, dedicated, and/or cloud-based data receiving and/or processing centers, such as a fleet monitor. The communications 62 may be used to upload and/or download data of various types. The navigation system 64 may store, retrieve, receive, and/or display various types of data including, for example and without limitation, weather/environmental data, road data including curvature, posted speed limits, and grade, as well as traffic data, as desired. The navigation system 64 may also be used to provide route instructions to a driver of the vehicle, and/or to provide a route for an autonomous drive controller to use. The navigation system 64 may include a global positioning system (GPS) device for determining and tracking position of the vehicle 50.

The controller 60 also includes a battery health block 70. In some instances, the battery health block 70 may be considered as a manifestation of the controller 18 (FIG. 1). The battery health block 70 may receive a number of sensor signals pertaining to battery conditions, and may use that information to determine a desired battery core temperature for the batteries 54. The battery health block 70 may command the battery thermal system 16 (FIG. 1) to take appropriate action to either heat or cool the batteries 54 in order to achieve the desired battery core temperature for the batteries 54.

In some instances, the vehicle 50 may be a hybrid vehicle, and as such may include an engine 72. The vehicle 50 may use a hybrid configuration such as P0, P1, P2, P3 and/or P4 hybrid vehicle powertrains, such as disclosed in U.S. Pat. No. 17,969,181, filed Oct. 19, 2022 and titled ENERGY EFFICIENT PREDICTIVE POWER SPLIT FOR HYBRID POWERTRAINS. The engine 72 may be an internal combustion engine, such as a gasoline, diesel, propane, or compressed natural gas engine, for example and without limitation. In some instances, the engine 72 may be a hydrogen-powered engine. In some instances, the engine 72 may be a fuel cell that generates electrical power that may be used to recharge the batteries 54 during operation of the vehicle 50. In instances in which the vehicle 50 is an electric vehicle, the engine 72 would not be included.

Figure 6:
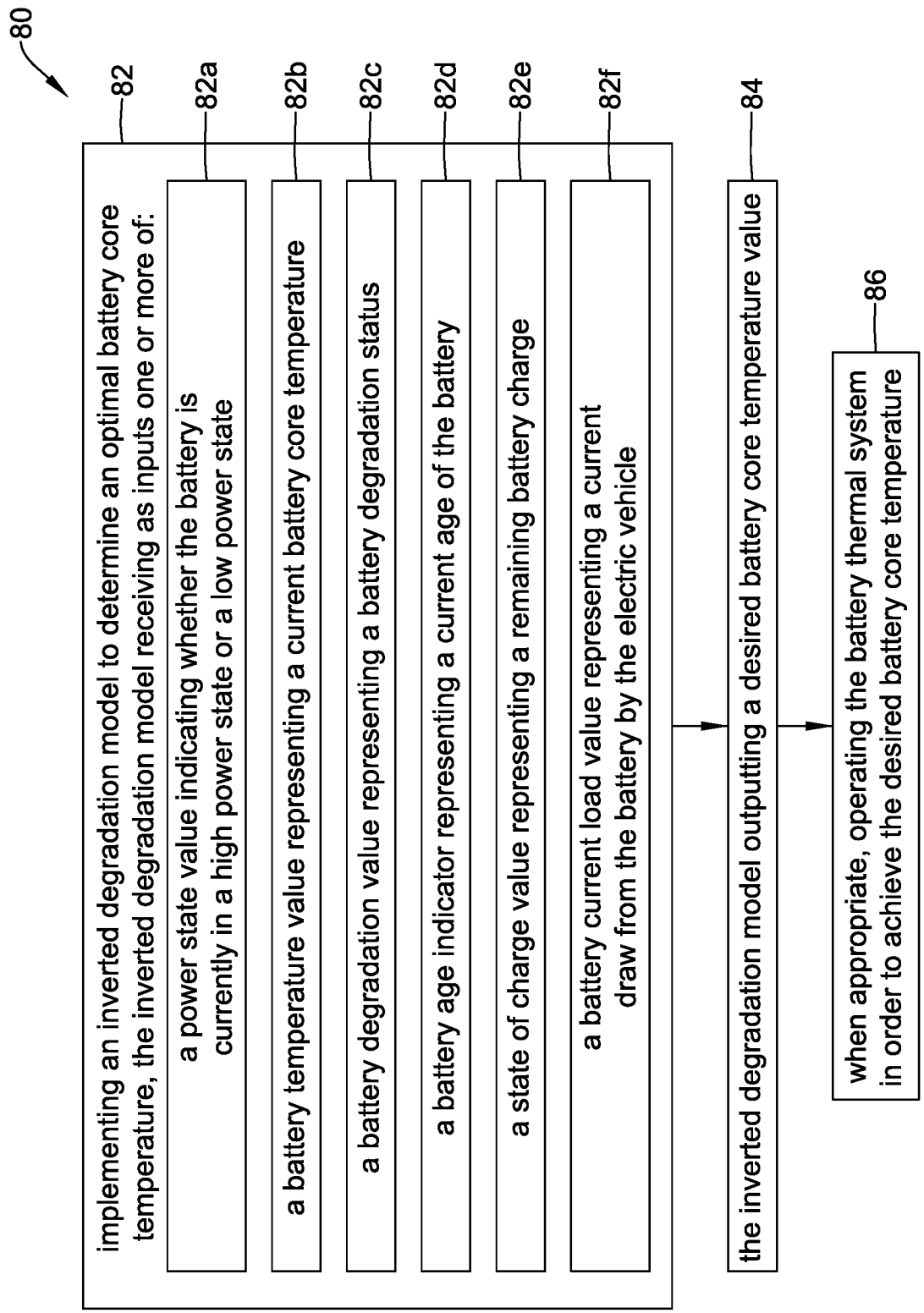
FIG. 6 is a flow diagram showing an illustrative method.

FIG. 6 is a flow diagram showing an illustrative method 80 of balancing performance and battery degradation for a battery installed within an electric vehicle that includes a battery thermal system. The method 80 includes implementing an inverted degradation model to determine an optimal battery core temperature, the inverted degradation model receiving a number of inputs, as indicated at block 82. The inputs may include a power state value indicating whether the battery is currently in a high-power state or a low power state, as indicated at block 82a. In some instances, the high-power state may correspond to operation of the electric vehicle. In some instances, the power state value further indicates whether the electric vehicle is being operated in an economy mode, a normal mode or a sport mode. In some instances, the high-power state may correspond to active charging of the battery.

The inputs may include a battery temperature value representing a current battery core temperature, as indicated at block 82b. The inputs may include a battery degradation value representing a battery degradation status, as indicated at block 82c. The inputs may include a battery age indicator representing a current age of the battery, as indicated at block 82d. The inputs may include a state of charge value representing a remaining battery charge, as indicated at block 82e. The inputs may include a battery current load value representing a current draw from the battery by the electric vehicle, as indicated at block 82f.

The inverted degradation model outputs a desired battery core temperature value, as indicated at block 84. When appropriate, the battery thermal system is operated in order to achieve the desired battery core temperature, as indicated at block 86. This may include heating the battery or a portion thereof, or cooling such by circulating a cooled fluid. In some instances, the inverted degradation model may be configured to weigh battery performance against battery degradation. As an example, the inverted degradation model may be configured to more heavily weigh battery degradation, at the expense of battery performance, when the battery age indicator is below a battery age threshold.

Figure 7:
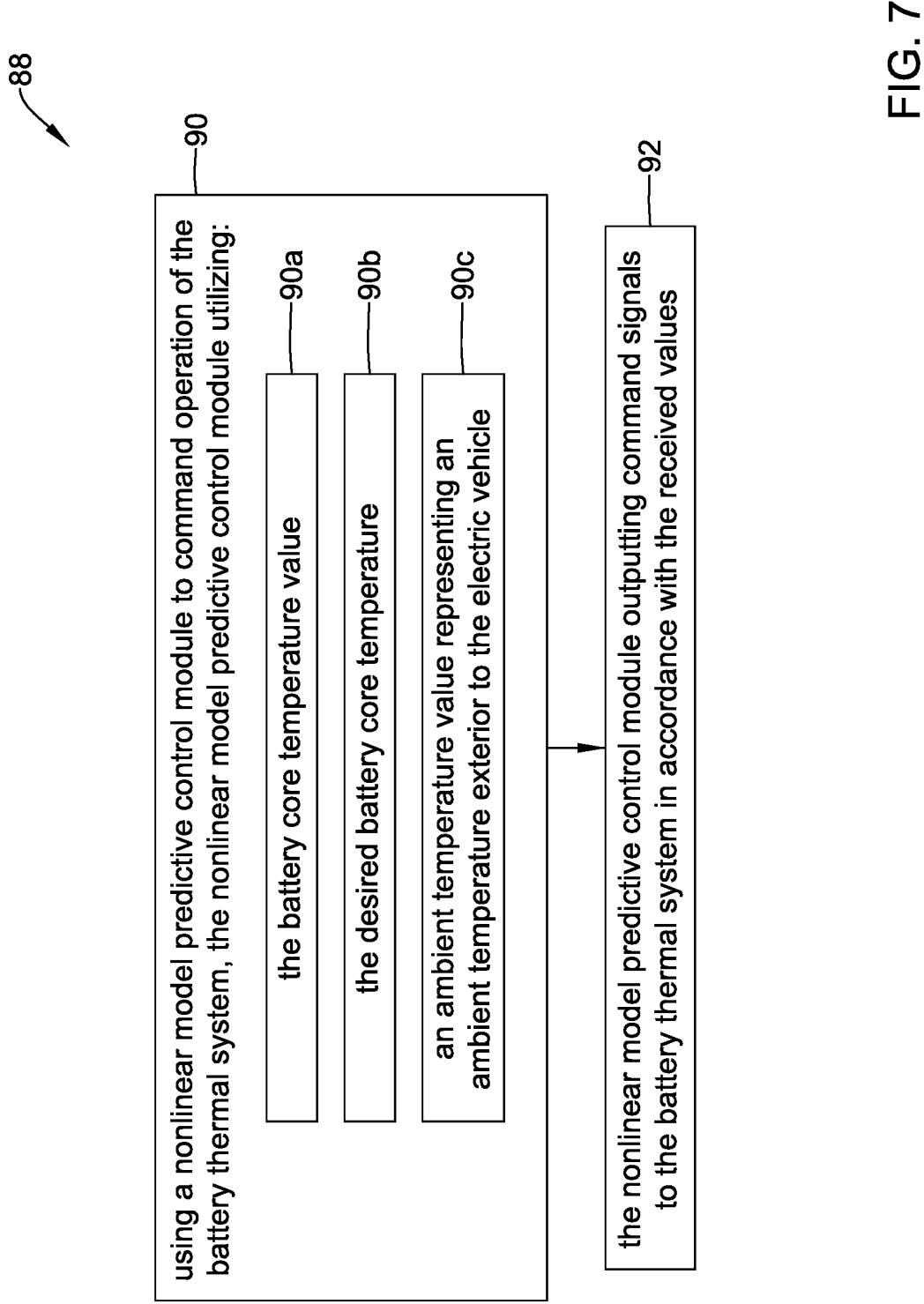
FIG. 7 is a flow diagram showing an illustrative method.

FIG. 7 is a flow diagram showing an illustrative method 88 for operating the battery thermal system in order to achieve the desired core battery temperature. The method 88 includes using a nonlinear model predictive control module to command operation of the battery thermal system, as indicated at block 90. The nonlinear model predictive control module utilizes the battery core temperature value, as indicated at block 90a. The nonlinear model predictive control module utilizes the desired battery core temperature, as indicated at block 90b. The nonlinear model predictive control module utilizes an ambient temperature value representing an ambient temperature exterior to the electric vehicle, as indicated at block 90c. The method 88 includes the nonlinear model predictive control module outputting command signals to the battery thermal system in accordance with the received values, as indicated at block 92.

Figure 8:
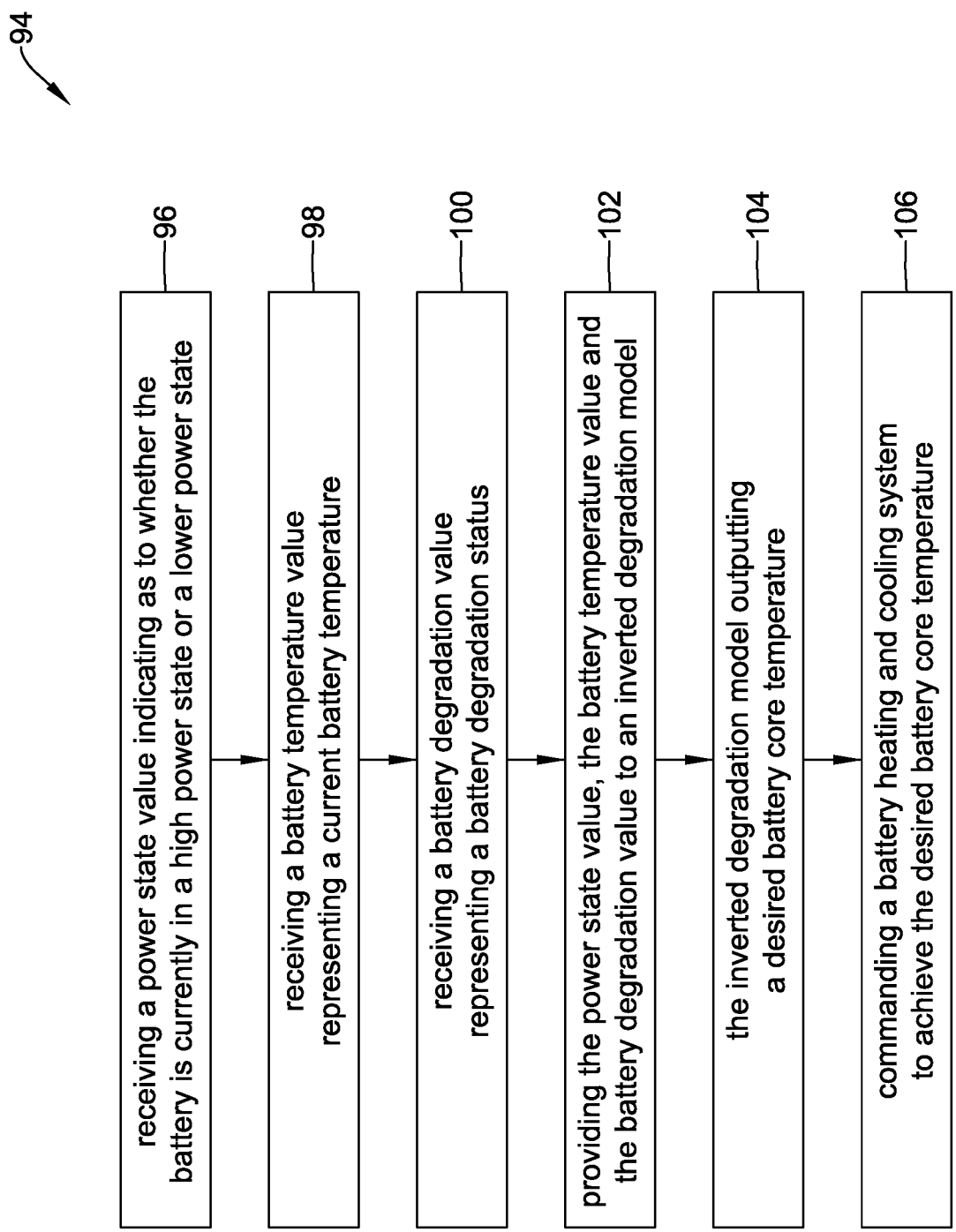
FIG. 8 is a flow diagram showing an illustrative method.

FIG. 8 is a flow diagram showing an illustrative method 94 of ascertaining an optimal battery thermal condition for a battery. In some instances, the battery may be installed within a power wall. In some instances, the battery may be installed within an electric vehicle or a hybrid vehicle. The method 94 includes receiving a power state value indicating as to whether the battery is currently in a high-power state or a lower power state, as indicated at block 96. In some instances, the high-power state may correspond to operation of the electric vehicle. In some instances, the power state value may further indicate whether the electric vehicle is being operated in an economy mode, a normal mode or a sport mode. In some instances, the high-power state may correspond to active charging of the battery.

A battery temperature value representing a current battery temperature is received, as indicated at block 98. A battery degradation value representing a battery degradation status is received, as indicated at block 100. The power state value, the battery temperature value and the battery degradation value are provided to an inverted degradation model, as indicated at block 102. The inverted degradation model outputs a desired battery core temperature, as indicated at block 104. A battery heating and cooling system is commanded to achieve the desired battery core temperature, as indicated at block 106.

Figure 9:
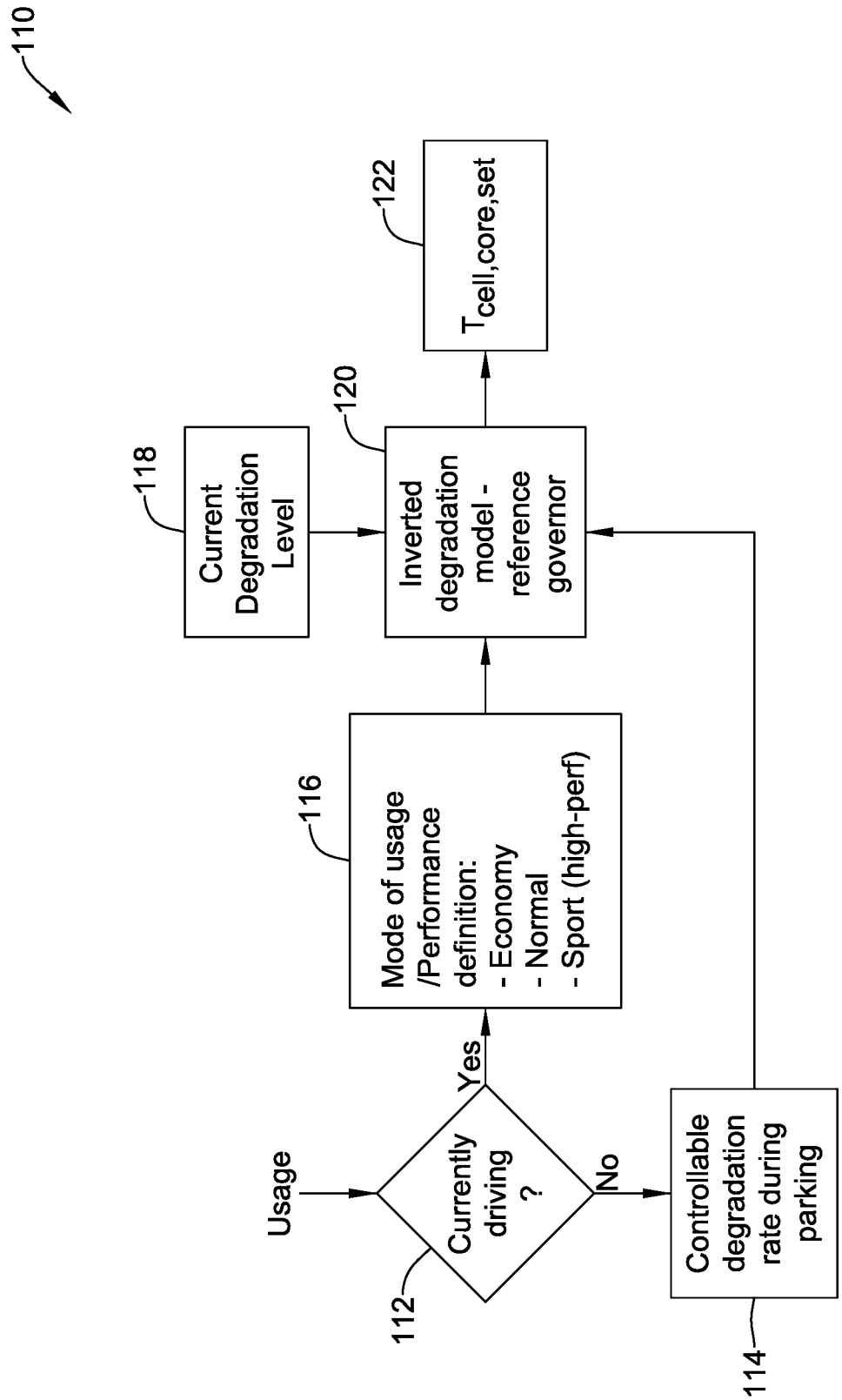
FIG. 9 is a schematic block diagram showing an illustrative system.

FIG. 9 is a schematic block diagram showing an illustrative system 110 for determining an optimal battery temperature setpoint. The system 110 begins at a decision block 112, with determining whether the vehicle is currently driving. If not, control passes to a block 114 where the system 110 determines an appropriate degradation rate for when the vehicle is parked. If the vehicle is currently driving, control passes to a block 116 where a mode of usage is determined. Control passes to a block 120, which implements an inverted degradation model. In some instances, a block 118 tracks a current battery degradation level, which is an input to the block 120. The block 120 outputs an optimal battery temperature setpoint, as indicated at block 122.

Figure 10:
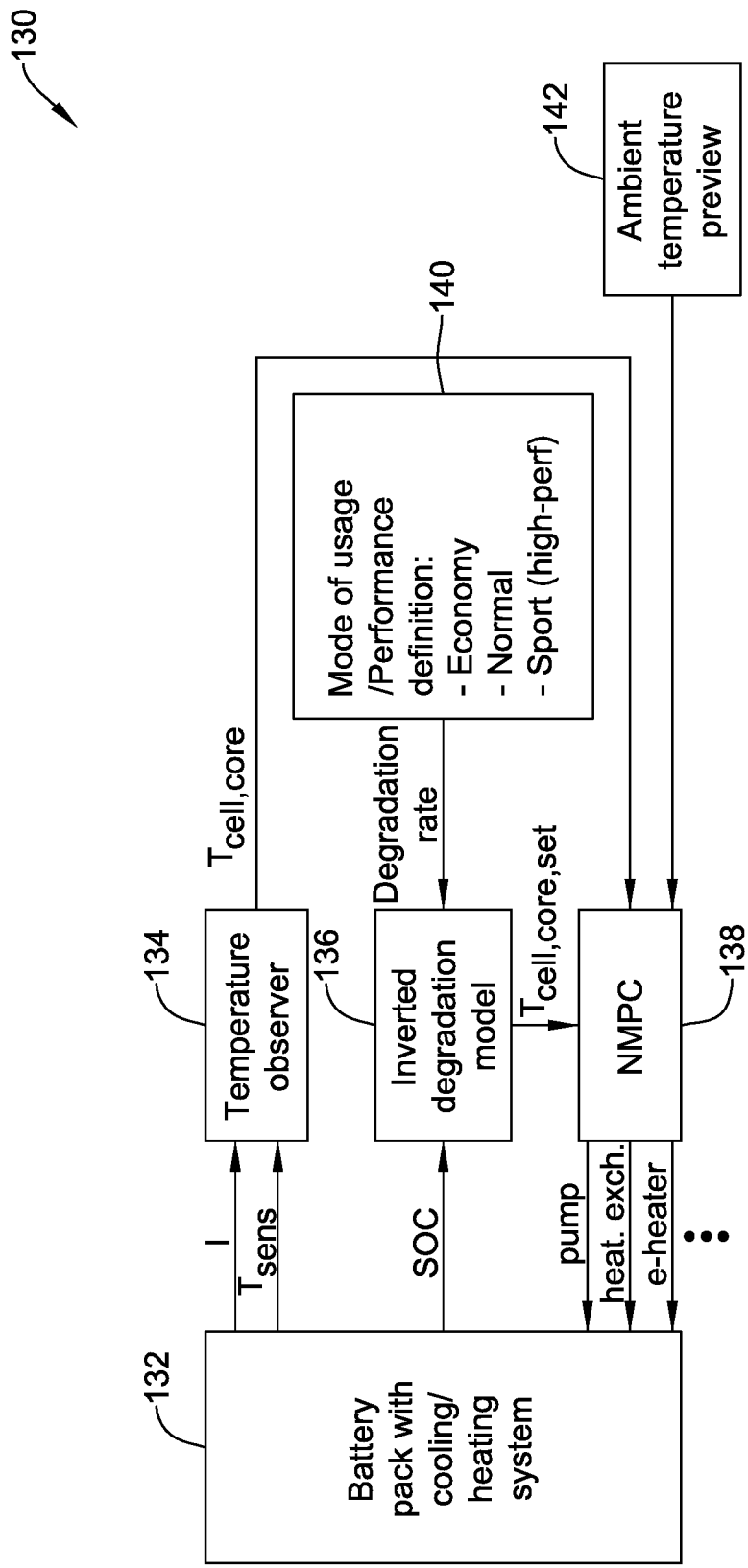
FIG. 10 is a schematic block diagram showing an illustrative system.

FIG. 10 is a schematic block diagram showing an illustrative system 130. The illustrative system 130 may be considered as being an example of the system 10 (FIG. 1). The system 130 includes a battery pack 132 including its own heating and cooling system. A current value "I" and a "$T_{sens}$" temperature value are outputted from the battery pack 132 to a temperature observer block 134. A SOC (state of charge) value is outputted from the battery pack 132 to an inverted degradation model block 136. A block 140 determines a mode of usage, and outputs a degradation rate to the inverted degradation model 136. The temperature observer block 134 outputs a current battery core temperature "$T_{cell, core}$" to an NMPC (non-linear model predictive control) block 136. An ambient temperature preview block 142 outputs an ambient temperature signal to the NMPC block 136. The inverted degradation model block 136 determines how, if at all, to operate the heating and cooling system that is built into the battery pack 132, and may output pump commands, heat exchanger commands and/or electric heater commands to the battery pack 132 and/or thermal management subsystem of the battery pack 132.

Figure 11:
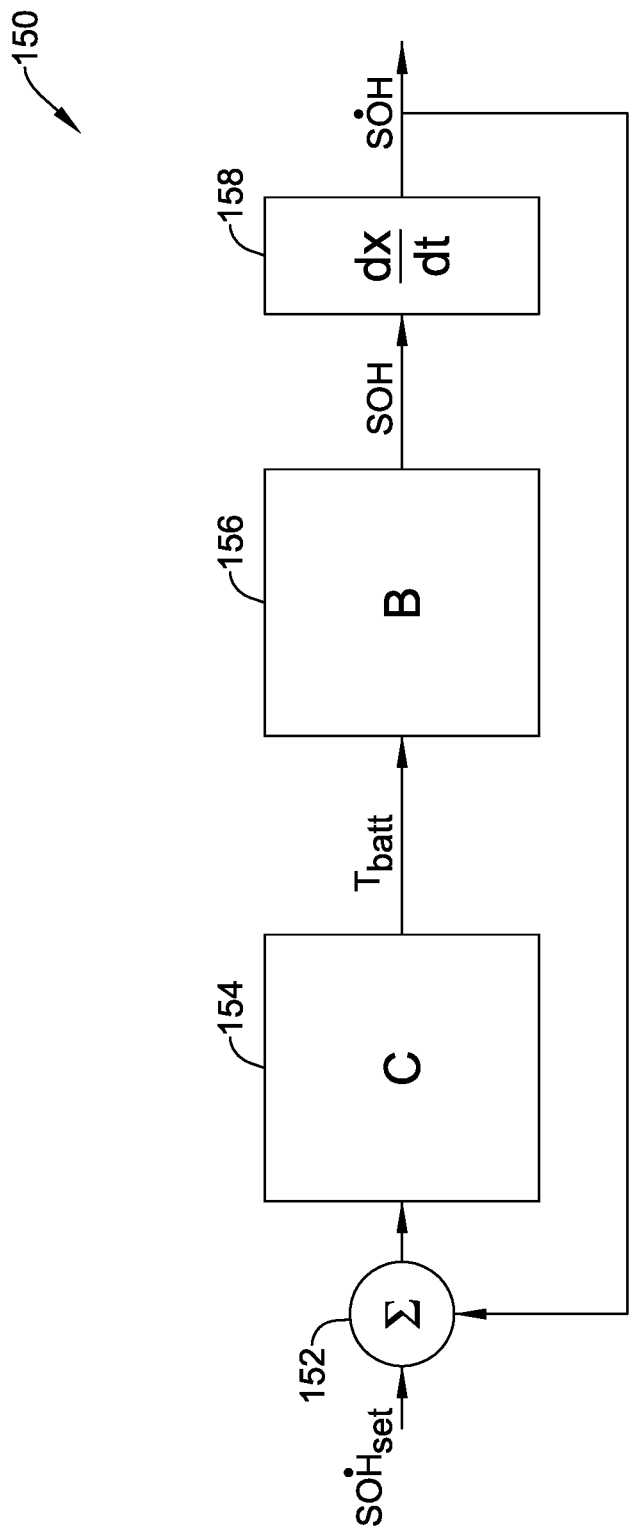
FIG. 11 is a schematic block diagram showing calculating of a rate at which a state of health of a battery is changing.

FIG. 11 is a schematic block diagram showing a control loop 150 that is used to invert the degradation model and compute the temperature profile when the desired degradation rate $SOH_{set}$ is given by the block 140 in FIG. 10A variable "$SOH_{set}$" (representing a rate of change in a state of health setpoint) is passed to a summation point 152. A result from the summation point 152 is passed to a block C 154, which represents a controller. In some instances, the block C may represent a PI controller, although other controllers including a P controller or a PID controller are contemplated. The block C 154 outputs a battery temperature value "$T_{batt}$". The battery temperature value is outputted to a block B 156, which outputs a state of health value "SOH". The block B 156 represents the battery degradation model described by the equations in FIG. 2. The state of health value is provided to a derivation block 158, which outputs a rate of change of the state of health "$\dot{SOH}$", which is provided to the summation block 152.

Figure 12:
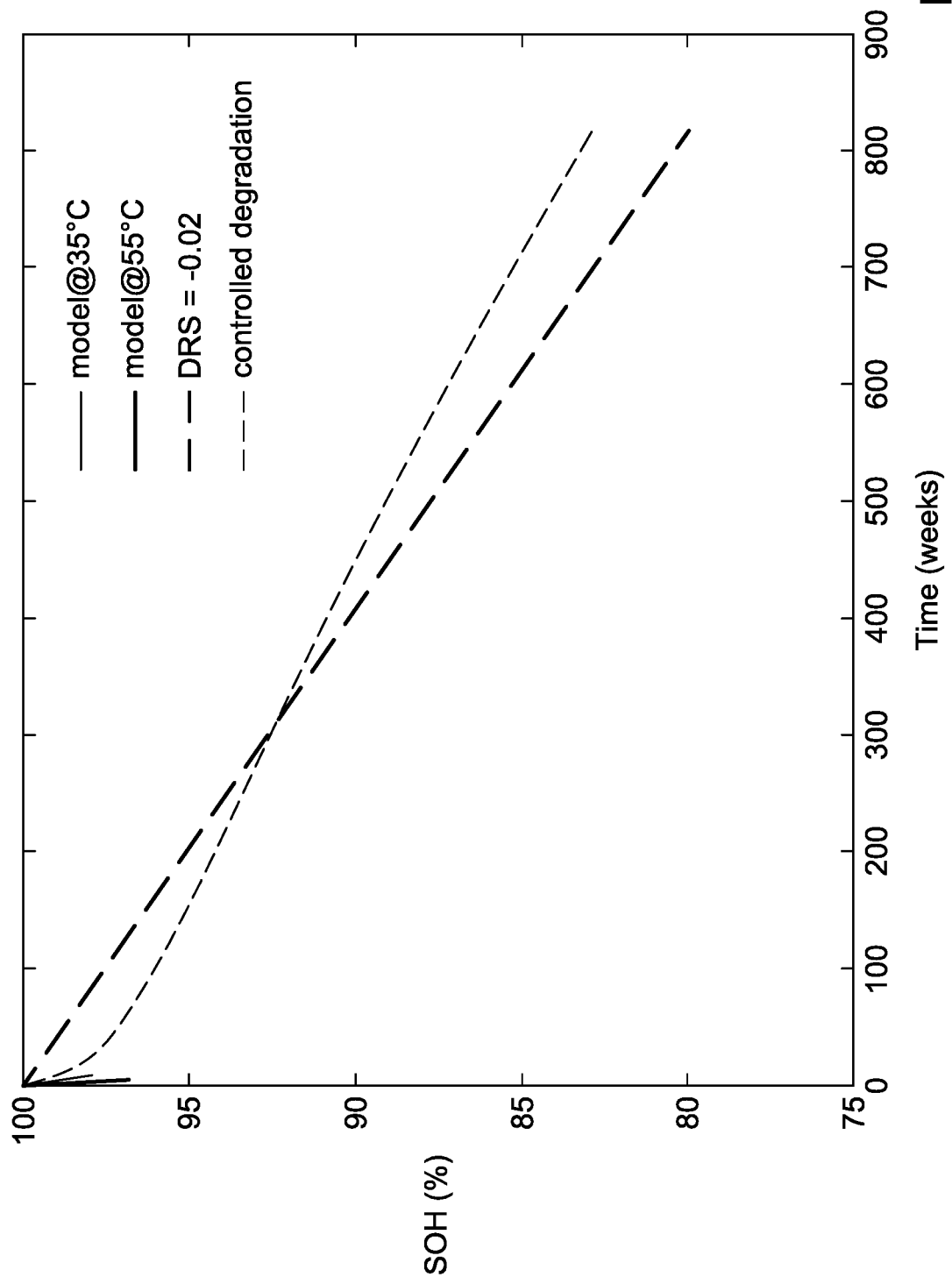
FIGS. 12 and 13 are graphical illustrations of a particular example.
Figure 13:
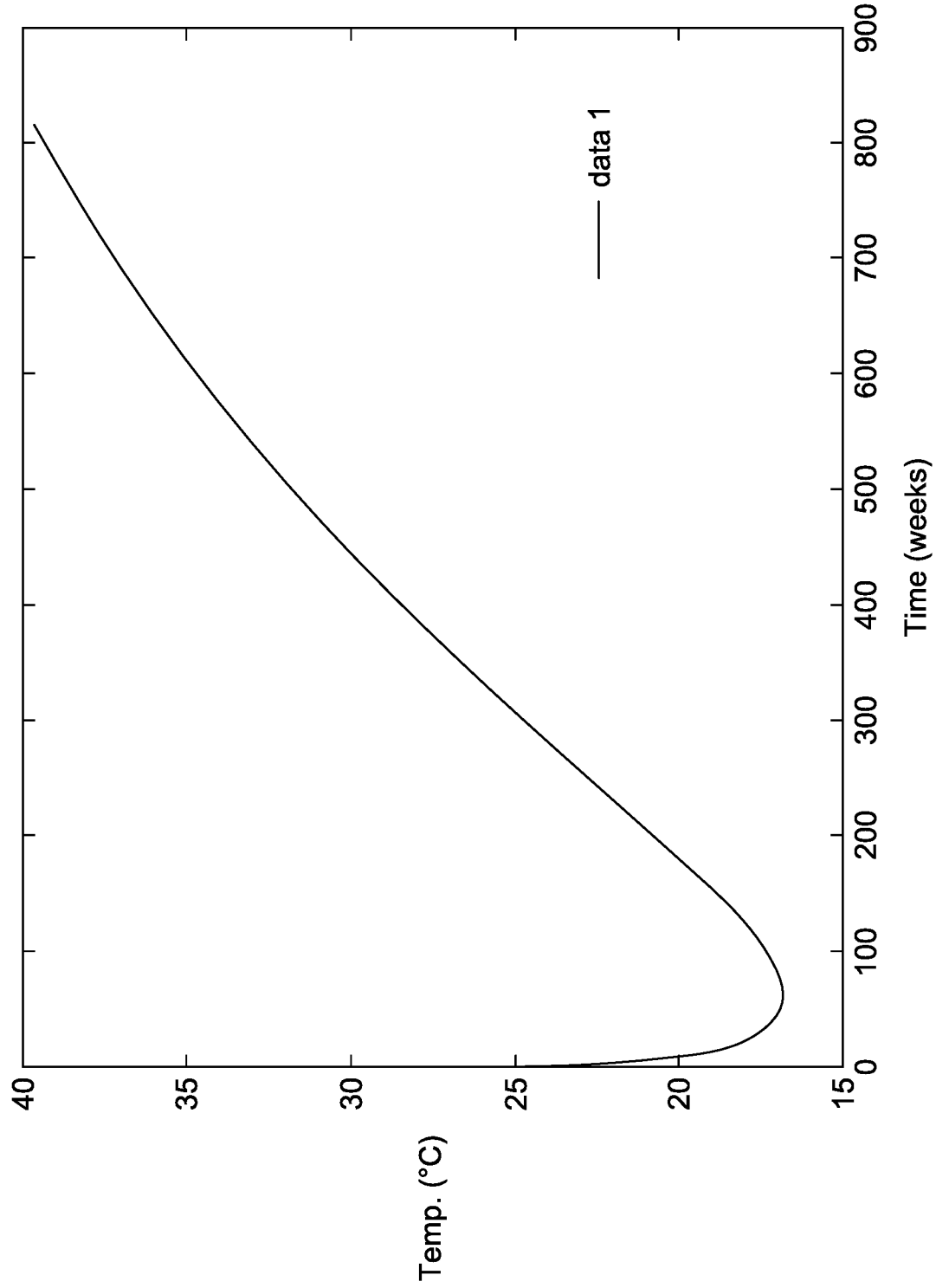

FIGS. 12 and 13 provide a graphical illustration. In FIG. 12, a first line 160 represents SOH (State of Health) versus time in weeks using a model at 35° C. and a second line 162 represents the SOH versus time in weeks using a model at 55° C. As can be seen, there is a significant improvement in SOH after 400 or 500 weeks, with the difference between the two models growing over time. FIG. 13 provides a graphical illustration of temperature versus time. A line 164 represents the temperature over time. The particular example shown in FIGS. 12 and 13 correspond to a PI controller with KP set equal to 5 and KI also set equal to 5. It will be appreciated that changing the values of these parameters (and possible those of other parameters) may alter the appearance of these graphs.

The above detailed description includes references to the accompanying drawings, which form a part of the detailed description. The drawings show, by way of illustration, specific embodiments. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. In the event of inconsistent usages between this document and any documents so incorporated by reference, the usage in this document controls. The terms "a" or "an" are used, as is common in patent documents, to include one or more than one, independent of any other instances or usages of "at least one" or "one or more."

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, innovative subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the protection should be determined with reference to the appended claims, along with the full scope of equivalents to which such claims are entitled.

What is claimed is:

1. A method of balancing performance and battery degradation for a battery installed within an electric vehicle, the electric vehicle including a battery thermal system, the method comprising:
    implementing an inverted degradation model to determine an optimal battery core temperature, the inverted degradation model receiving inputs comprising:
        a power state value indicating whether the battery is currently in a high-power state or a low power state;
        a battery temperature value representing a current battery core temperature;
        a battery degradation value representing a battery degradation status;
        a battery age indicator representing a current age of the battery;
        a state of charge value representing a remaining battery charge; and
        a battery current load value representing a current draw from the battery by the electric vehicle;
    the inverted degradation model outputting a desired battery core temperature value determined based on the inputs received by the inverted degradation model; and
    operating the battery thermal system in order to achieve the desired battery core temperature based on the desired battery core temperature value provided as an output from the inverted degradation model.

2. The method of claim 1, wherein the inverted degradation model is configured to weigh battery performance against battery degradation.

3. The method of claim 2, wherein the inverted degradation model is configured to more heavily weigh battery degradation, at the expense of battery performance, when the battery age indicator is below a battery age threshold.

4. The method of claim 1, wherein the high-power state corresponds to operation of the electric vehicle.

5. The method of claim 4, wherein the power state value further indicates whether the electric vehicle is being operated in an economy mode, a normal mode or a sport mode.

6. The method of claim 1, wherein the high-power state corresponds to active charging of the battery.

7. The method of claim 1, wherein operating the battery thermal system in order to achieve the desired core battery temperature comprises:
    using a nonlinear model predictive control module to command operation of the battery thermal system, the nonlinear model predictive control module utilizing:
        the battery core temperature value;
        the desired battery core temperature; and
        an ambient temperature value representing an ambient temperature exterior to the electric vehicle; and
    the nonlinear model predictive control module outputting command signals to the battery thermal system in accordance with the received values.

8. A system for optimizing battery health in an electric vehicle, the system comprising:
    an input for receiving sensor signals;
    an output for sending command signals;
    a controller including:
        an inverted degradation model block that is configured to receive a plurality of input values including values obtained from the sensor signals from the input, and to provide a desired battery core temperature value based on the plurality of input values, wherein the plurality of input values include:
            a power state value indicating whether the battery is currently in a high-power state or a low power state,
            a battery temperature value representing a current battery core temperature,
            a battery degradation value representing a battery degradation status,
            a battery age indicator representing a current age of the battery,
            a state of charge value representing a remaining battery charge, and
            a battery current load value representing a current draw from the battery by the electric vehicle; and
        a non-linear model predictive control block that is configured to receive the desired battery core temperature value from the inverted degradation model block and to provide one or more command signals to the output, the one or more command signals commanding operation of a battery thermal system based on the desired battery core temperature value provided as an output from the inverted degradation model.

9. The system of claim 8, the high-power state corresponds to operation of the electric vehicle.

10. The system of claim 9, wherein the power state value further indicates whether the electric vehicle is being operated in an economy mode, a normal mode or a sport mode.

11. The system of claim 9, wherein the inverted degradation model block further is configured to track an indication of battery age.

12. The system of claim 8, wherein the non-linear model predictive block receives sensor signals including one or more of:
the battery temperature value from a first temperature sensor; and
an ambient temperature value representing an ambient temperature exterior to the electric vehicle from a second temperature sensor.

13. A method for optimizing health of a battery, the method comprising:
receiving a state of charge value representing a remaining battery charge;
receiving a battery temperature value representing a current battery temperature;
receiving a battery age value representing a current age of the battery;
calculating a capacity loss coefficient for the battery based on the state of charge value and the battery temperature value;
calculating a relative capacity variation by multiplying the capacity loss coefficient by the battery age value; and
outputting the relative capacity variation to control a battery heating and cooling system to achieve a desired battery core temperature for the battery.

14. The method of claim 13, wherein the battery is installed within a home power system.

15. The method of claim 13, wherein the battery is installed within an electric vehicle.

16. The method of claim 15, further comprising:
receiving a power state value indicating as to whether the battery is currently in a high-power state or a lower power state, wherein the high-power state corresponds to operation of the electric vehicle.

17. The method of claim 16, wherein the power state value further indicates whether the electric vehicle is being operated in an economy mode, a normal mode or a sport mode.

18. The method of claim 16, wherein the high-power state corresponds to active charging of the battery.

19. The system of claim 8, wherein the inverted degradation model is configured to weigh battery performance against battery degradation.

20. The method of claim 13, wherein the battery age value representing a current age of the battery is tracked using a timer.

* * * * *